United States Patent

Rumanowski

[15] 3,647,413

[45] Mar. 7, 1972

[54] ALKYL-N-ALKYL-CHLOROPHENOX-YTHIOACETIMIDATES AS SELECTIVE HERBICIDES

[72] Inventor: Edmund J. Rumanowski, Dover, N.J.

[73] Assignee: Allied Chemical Corporation, New York, N.Y.

[22] Filed: July 3, 1969

[21] Appl. No.: 839,078

[52] U.S. Cl. ............................................71/98, 260/453 R
[51] Int. Cl. .........................................................A01n 9/12
[58] Field of Search ...................................260/453 R; 71/98

[56] References Cited

UNITED STATES PATENTS

| | | | |
|---|---|---|---|
| 2,412,510 | 12/1946 | Jones | 71/98 |
| 2,811,526 | 10/1957 | Burtner | 260/453 R |
| 3,394,181 | 7/1968 | Bell | 424/327 |
| 3,424,723 | 1/1969 | Yates et al. | 71/98 |
| 3,488,355 | 1/1970 | Levy | 260/453 R |

FOREIGN PATENTS OR APPLICATIONS

| | | | |
|---|---|---|---|
| 1,207,146 | 12/1965 | Germany | 71/98 |

OTHER PUBLICATIONS

Johnston, " The Relationship of Structure to Activity in Plant Growth-Regulating Compounds." (1961) CA 55 p. 24,622

*Primary Examiner*—Elbert L. Roberts
*Assistant Examiner*—G. Hollrah
*Attorney*—Patrick L. Henry and Fred L. Kelly

[57] ABSTRACT

Alkyl-N-alkyl-chlorophenoxythioacetimidates are prepared by reacting N-alkyl-di- or trichlorophenoxythioacetamide with alkyl iodide in the presence of sodium alcholate. The compounds are useful as herbicides.

6 Claims, No Drawings

ALKYL-N-ALKYL-CHLOROPHENOXYTHIOACETIMIDATES AS SELECTIVE HERBICIDES

BACKGROUND OF THE INVENTION

This invention relates to novel chlorophenoxythioacetimidates; in particular, it relates to alkyl-N-alkyl-chlorophenoxythioacetimidates, their preparation and use as herbicides.

The need to control undesirable plant growth for efficient cultivation of crops has given rise to the development of a great variety of herbicidal agents. However, many of the chemical herbicides available heretofore do not have adequate potency or selectivity to afford optimum results. An effective herbicide must be highly effective against undesirable plants while remaining harmless with respect to the plant being cultivated, such as corn and wheat.

SUMMARY OF THE INVENTION

The novel compounds of the instant invention are di- and trichlorophenoxythioacetimidates of the formula:

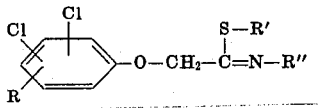

wherein R is hydrogen or chlorine, and R' and R'' are lower alkyls having one to four carbon atoms.

These compounds are prepared by reacting N-alkyl-di- or trichlorophenoxythioacetamide with alkyl iodide in the presence of a sodium alcoholate to form the corresponding alkyl-N-alkyl-di- or trichlorophenoxythioacetimidates. The novel compounds are useful as herbicides.

DETAILED DESCRIPTION OF THE INVENTION

Preparation of the instant compounds is accomplished by reacting a lower alkyl iodide with the appropriate N-alkyl-chlorophenoxythioacetamide in the presence of an equivalent amount of sodium alcoholate, for example, according to the following sequence:

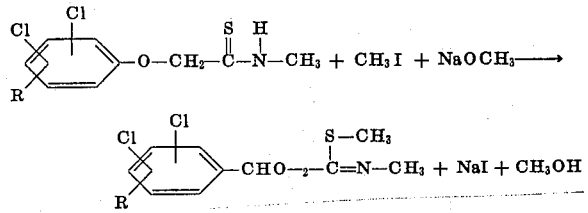

Approximately equimolar amounts of the two substrates may be used, although an excess of either might be used to achieve a higher yield with respect to the other.

The reaction may be conducted in an inert solvent; it is convenient to use an alcohol which is a byproduct of the synthesis. Preferably, the reaction will be conducted at a temperature within the range of 35°–70° C., and more preferably, 40°–45° C. Reaction times as short as about one-half hour or less have been found to be adequate, although longer reaction times may be used if desired. Atmospheric pressure is normally used for the reaction, although subatmospheric or superatmospheric conditions might be employed.

Substrate materials are readily available by procedures taught in the prior art. For example, the various chlorophenoxythioacetamides might be prepared by reacting the appropriate chlorophenoxyacetonitrile with alcoholic solution of ammonia and hydrogen sulfide (Fritzsche, Journal of Pracktische Chimie (2) 20, 279). The corresponding N-alkyl-chlorophenoxythioacetamides may be prepared by reacting the thioacetamides with an alkylamine. Alkyl iodide is available commercially.

The instant compounds have been found to be unexpectedly effective herbicides in that they are very harmful to plants normally considered undesirable, such as rape and broadleafed weeds, while being relatively harmless toward such plants as corn and wheat. Methyl-N-methyl-2,4-dichlorophenoxythioacetimidate is the preferred compound for this purpose; it is especially useful as a preemergence herbicide and is effective against crabgrass.

Normally, the instant compounds will be used as the active ingredient in an herbicidal composition, although they might also be used without a carrier. Various diluents and carriers may be employed and the percent of active ingredient may be varied. Although compositions with less than about 0.5 percent by weight of active ingredient may be used, it is preferable to use compositions containing at least about 1.0 percent of active ingredient because otherwise the amount of carrier becomes excessively large. Activity increases with the concentration of active ingredient, which may be 10, 50, 95 percent or even higher.

The amount of composition which is applied for effective herbicidal action is dependent upon considerations such as the type of undesirable plant to be killed, the density of undesirable plants, and soil and climatic conditions. Usually, sufficient composition will be applied to provide about 8 to 16 pounds of active ingredient per acre.

The instant herbicidal compositions may be in the form of a solution, with the solvent being selected from acetone, dichloromethane and the like. These solutions can be applied to the plants in a direct manner such as by spraying, sprinkling, drenching, etc. Water suspensions can also be applied in this manner, with dispersing and emulsifying agents such as sodium alkyl sulfates and sulfonates and the like.

Application can also be achieved by dusting a powder in which the active ingredient is dispersed. Suitable carriers include finely powdered material such as clays, fuller's earth, talc, etc.

The instant compounds may constitute the sole active ingredient in the herbicidal compositions, but they might be effectively used in combination with other active ingredients, such as other herbicides, insecticides and other plant treating agents.

The following examples are provided to more fully illustrate the instant invention. They are provided for illustrative purposes only and are not to be construed as limiting the scope of the instant invention, which is defined by the appended claims.

EXAMPLE I

Preparation of Methyl-N-Methyl-2,4-Dichlorophenoxythioacetimidate

Five grams of N-methyl-2,4-dichlorophenoxythioacetamide, 3.6 grams of methyl iodide and a few drops of phenolphthalein were added to a 100 ml. three-necked flask containing 60 ml. of absolute ethanol. The flask was fitted with a reflux condenser, a stirrer, and a thermometer. About 1.4 grams of sodium methylate in 20 ml. of absolute ethanol was then added slowly with stirring to the mixture over a period of 15 minutes while maintaining the temperature of the mixture between 40° and 45° C. The mixture was heated at 40° to 45° C. and stirred for another 15 minutes, until about neutral, as indicated by the disappearance of the red phenolphthalein color. Water was then added to the mixture and the mixture was filtered. The separated solid material was mixed with 25 ml. of methanol and the mixture was filtered. The separated solid was dried. Yield was 3.5 grams, melting between 86° to 88° C. A melting point of 88° to 89° C. was obtained by recrystallizing from methanol.

Analysis

|  | Calculated | Found |
|---|---|---|
| Carbon, % | 45.5 | 45.3 |
| Hydrogen, % | 4.2 | 4.2 |

EXAMPLE II

The procedure of Example I is repeated wherein an equivalent amount of appropriate chlorophenoxythioacetamide is used to afford the following products:

Methyl-N-methyl-2,5-dichlorophenoxythioacetimidate

Methyl-N-methyl-2,6-dichlorophenoxythioacetimidate
Methyl-N-methyl-3,5-dichlorophenoxythioacetimidate
Methyl-N-methyl-2,4,5-trichlorophenoxythioacetimidate
Methyl-N-methyl-2,4,6-trichlorophenoxythioacetimidate
Methyl-N-methyl-3,4,5-trichlorophenoxythioacetimidate

EXAMPLE III

Herbicidal Activity

The following crop species and weed species were planted in metal flats (12 by 8.5 by 4 inches) in greenhouse potting soil containing one-third mixed clay and sand, one-third mushroom soil, and one-third peat moss. The pH of the soil was 6.8 to 7.2.

Crop Species
Corn, *Zea mays*, Hybrid U.S. 13
Wheat, *Triticum vulgare*, variety Thorne
Weed Species
Rape
Crabgrass Each flat received a volume of spray equal to 80 gallons per acre of an acetone solution of methyl-N-methyl-2,4,-dichlorophenoxythioacetimidate. The concentration of the solution was adjusted to provide application of 16 pounds of active ingredient per acre. Immediately after spraying, the test flats were placed in aluminum trays and were irrigated until the surface of the soil in the flat was uniformly moist (at field capacity). Additional subirrigation was provided as needed to maintain moisture. No surface irrigation was applied.

The flats were sprayed within 1 day after seeding in preemergence tests, and 8 to 10 days after seeding in the postemergence tests. Results were observed 14 days after spraying.

The effect of the herbicides was evaluated in terms of the injury-rating index scale, ranging from 0 to 10 as follows:

```
0   — No apparent injury
1,2,3 — Slight injury
4,5,6 — Moderate injury
7,8,9 — Severe injury (plants will die)
 10  — Plants were dead
```

An injury rating of 3 is the maximum tolerated for crops and a rating of 7 is the minimum acceptable on weed plants.

| Plant | Preemergence | Injury Rating Postemergence |
|---|---|---|
| Corn | 2 | 4 |
| Wheat | 2 | 4 |
| Rape | 10 | 10 |
| Crabgrass | 8 | — |

I claim:

1. A herbicidal composition comprising an inert carrier and a herbicidally toxic amount of an active ingredient of the formula:

[structure: dichlorophenyl-O-CH$_2$-C(S-CH$_3$)=N-CH$_3$ with R substituent]

wherein R is hydrogen or chlorine.

2. The herbicidal composition of claim 1 wherein R is hydrogen.

3. The herbicidal composition of claim 1 wherein said compound is methyl-N-methyl-2,4-dichlorophenoxythioacetimidate.

4. A method of controlling rape and crabgrass in corn and wheat which comprises spraying soil in which the corn and wheat are planted, prior to emergence of the corn and wheat, with a compound of the formula:

[structure: trichlorophenyl-O-CH$_2$-C(S-CH$_3$)=N-CH$_3$]

wherein R is hydrogen or chlorine, in an amount sufficient to inhibit the growth of the rape and crabgrass.

5. The method of claim 4 wherein R is hydrogen.

6. The method of claim 4 wherein said compound is methyl-N-methyl-2,4-dichlorophenoxy-thioacetimidate.

* * * * *

UNITED STATES PATENT OFFICE
CERTIFICATE OF CORRECTION

Patent No. 3,647,413   Dated March 7, 1972

Inventor(s) Edmund J. Rumanowski

It is certified that error appears in the above-identified patent and that said Letters Patent are hereby corrected as shown below:

Column 1, line 40, after "of" insert --a--.

Column 1, line 48: Cancel

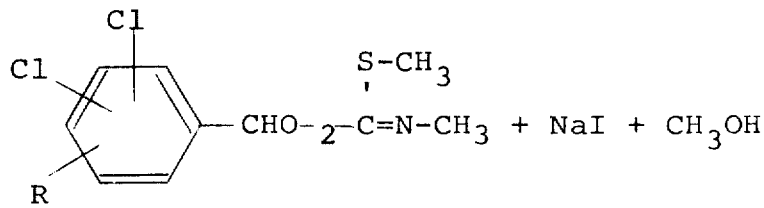

and substitute:

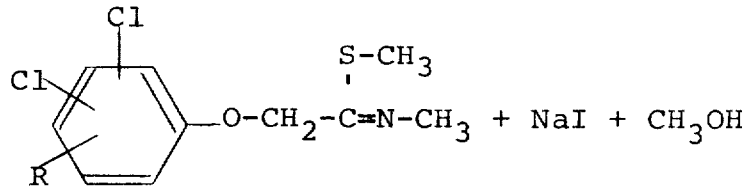

Signed and sealed this 28th day of November 1972.

(SEAL)
Attest:

EDWARD M. FLETCHER, JR.
Attesting Officer

ROBERT GOTTSCHALK
Commissioner of Patents